United States Patent
Eum et al.

(10) Patent No.: US 7,237,249 B2
(45) Date of Patent: Jun. 26, 2007

(54) DISK DRIVE WITH DISK CARTRIDGE

(75) Inventors: Jae-yong Eum, Suwon-si (KR);
Yong-hoon Lee, Suwon-si (KR);
Jeung-rak Lee, Suwon-si (KR);
Hong-kyun Yim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 11/045,140

(22) Filed: Jan. 31, 2005

(65) Prior Publication Data
US 2005/0177839 A1   Aug. 11, 2005

(30) Foreign Application Priority Data
Feb. 10, 2004  (KR) ................ 10-2004-0008638

(51) Int. Cl.
*G11B 33/02* (2006.01)
(52) U.S. Cl. ........................... 720/742
(58) Field of Classification Search .......... 720/724, 720/738, 740, 741; 369/77.2
See application file for complete search history.

(56) References Cited

U.S. PATENT DOCUMENTS

| | | | | |
|---|---|---|---|---|
| 6,944,875 B2 * | 9/2005 | Kawaguchi et al. | ........ | 720/741 |
| 7,017,170 B2 * | 3/2006 | Iwaki et al. | ................ | 720/741 |
| 2004/0062175 A1 * | 4/2004 | Inoue | ........................ | 369/77.2 |
| 2004/0148624 A1 * | 7/2004 | Inoue | ........................ | 720/741 |
| 2004/0210921 A1 * | 10/2004 | Shibagaki et al. | .......... | 720/741 |

* cited by examiner

*Primary Examiner*—Tianjie Chen
(74) *Attorney, Agent, or Firm*—Stein, McEwen & Bui, LLP

(57) ABSTRACT

A disk drive including a tray on which a disk cartridge is mounted and is loaded into and unloaded from a main body; a guide formed on the tray; and an opening and closing member installed to be elastically connected to the guide. The opening and closing member has a second gear that rotates a rotating wheel by meshing with a first gear; and a first protrusion formed on one end of a second gear and to temporarily rotate the rotating wheel so that the first and second gears can mesh. The guide pushes the first protrusion during loading/unloading of the tray so that the first protrusion and the latch do not come in contact with each other.

23 Claims, 14 Drawing Sheets

DISK DRIVE WITH DISK CARTRIDGE

CROSS-REFERENCE TO RELATED APPLICATION

This application claims the priority of Korean Patent Application No. 2004-8638, filed on Feb. 10, 2004 in the Korean Intellectual Property Office, the disclosure of which is incorporated herein in its entirety by reference.

BACKGROUND OF THE INVENTION

1. Field of the Invention

The present invention relates to a disk drive with a disk cartridge to accomodate a disk (i.e., an information recording/reproducing medium) so as to protect a recording surface of the disk from contamination sources such as dust and fingerprints.

2. Description of the Related Art

As the density of information stored on a disk increases to allow more information to be stored on the disk, recording and reproducing information efficiency of the disk are greatly affected by dust, scratches, or fingerprints on the disk. Thus, a disk cartridge is generally used to protect the disk.

A conventional disk cartridge has an aperture so that a spindle motor which rotates the disk and an optical pickup which records information to or reads information from a recording surface of the disk can access the disk. Additionally, the disk cartridge has a shutter that opens and closes the aperture when necessary. Furthermore, the disk cartridge has a latch that locks the shutter so that the shutter does not open the aperture due to an external impact when the aperture is closed.

A disk drive that records/reproduces information to/from the disk protected by a conventional disk cartridge includes a tray on which the disk cartridge is mounted and an opening/closing member to open and close an aperture of the conventional disk cartridge. The opening/closing member opens and closes the aperture in connection with a loading/unloading operation. A slot is formed in one side of the disk cartridge so that the opening/closing member may access the latch. Noise may be produced when the opening/closing member comes into contact with either ends of the slot during a loading/unloading operation of the tray. Since both ends of the slot are generally sharp, the opening/closing member may be damaged due to the repetitive contact with the ends of the slot or both ends of the slot may be damaged.

In addition, the opening/closing member has to release a latch to open the aperture when the disk cartridge is loaded and to operate the latch to lock the shutter so that the shutter does not open after the aperture is closed when the disk cartridge is unloaded. If the shutter is not locked firmly, the aperture may open while transporting the disk cartridge, thereby contaminating the recording surface of the disk by foreign substances, e.g., dust and fingerprints. When the ends of the slot or the opening/closing member are damaged by repetitive contact, the shutter cannot be locked firmly.

SUMMARY OF THE INVENTION

Accordingly, it is an aspect of the present invention to provide a disk drive that can lock a shutter with a high reliability by decreasing unnecessary contact between an opening/closing member and a disk cartridge when the opening/closing member accesses the disk cartridge.

Additional aspects and/or advantages of the invention will be set forth in part in the description which follows and, in part, will be obvious from the description, or may be learned by practice of the invention.

According to an aspect of the present invention, there is provided a disk drive with a disk cartridge mounted therein, the disk cartridge including a case with an aperture in which a disk is accommodated, a rotating wheel having a first gear formed on an outer circumference thereof and rotating to open and close the aperture, and a latch to lock the rotating wheel when the aperture is closed, the disk drive including: a main body; a tray on which the disk cartridge is mounted and is loaded into and unloaded from the main body; and an opening and closing member formed on the main body including: a second gear rotating the rotating wheel by meshing with the first gear and, a first protrusion formed on a first end of the second gear and temporarily rotating the rotating wheel so that the first and second gears mesh. A guide is formed on a side of the tray to push the first protrusion during the loading/unloading of the tray so that the first protrusion and the latch do not come in contact with each other.

According to an aspect of the present invention, the opening and closing member further includes a second protrusion formed on a second end of the second gear, and the guide pushes the second protrusion during loading/unloading of the tray so that the second protrusion and the latch do not come in contact with each other.

According to an aspect of the present invention, the first and second protrusions, and the second gear are installed on the main body after being manufactured as separate members, or may also be manufactured as a single body.

According to another aspect of the present invention, there is provided a disk drive with a disk cartridge mounted therein, the disk cartridge including a case with an aperture in which a disk is accommodated, a rotating wheel with a first gear formed on an outer circumference thereof and rotating to open and close the aperture, and a latch to lock the rotating wheel when the aperture is closed, the disk drive including: a main body; a tray on which the disk cartridge is mounted and is loaded into and unloaded from the main body; and an opening and closing member formed on the main body having: a second gear rotating the rotating wheel by meshing with the first gear, and a first protrusion formed on a first end of the second gear and temporarily rotating the rotating wheel so that the first and second gears mesh. A slot including first and second ends formed on a side of the disk cartridge through which the first protrusion accesses the rotating wheel. A first contact preventer is formed on a side of the tray to push the opening and closing member to prevent the first protrusion from contacting the first and second ends of the slot.

According to another embodiment of the present invention, a recessed portion is formed on the side of the disk cartridge to prevent the disk cartridge from being mounted on the tray upside down. The disk drive further includes a second contact preventer formed on the side of the tray to prevent the recessed portion from coming in contact with the first protrusion.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
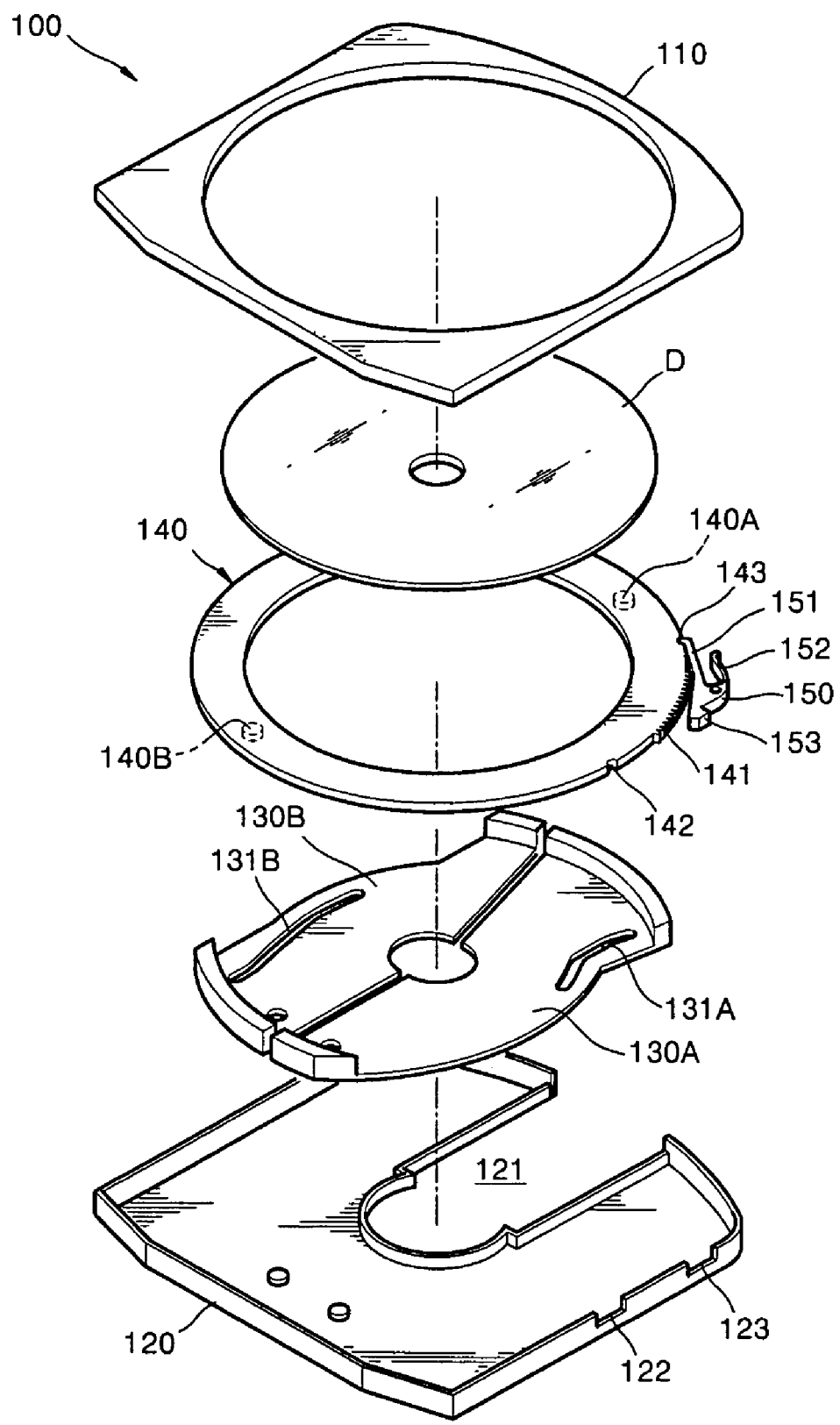
FIG. 1 is an exploded perspective view of a disk cartridge to be mounted inside a disk drive according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
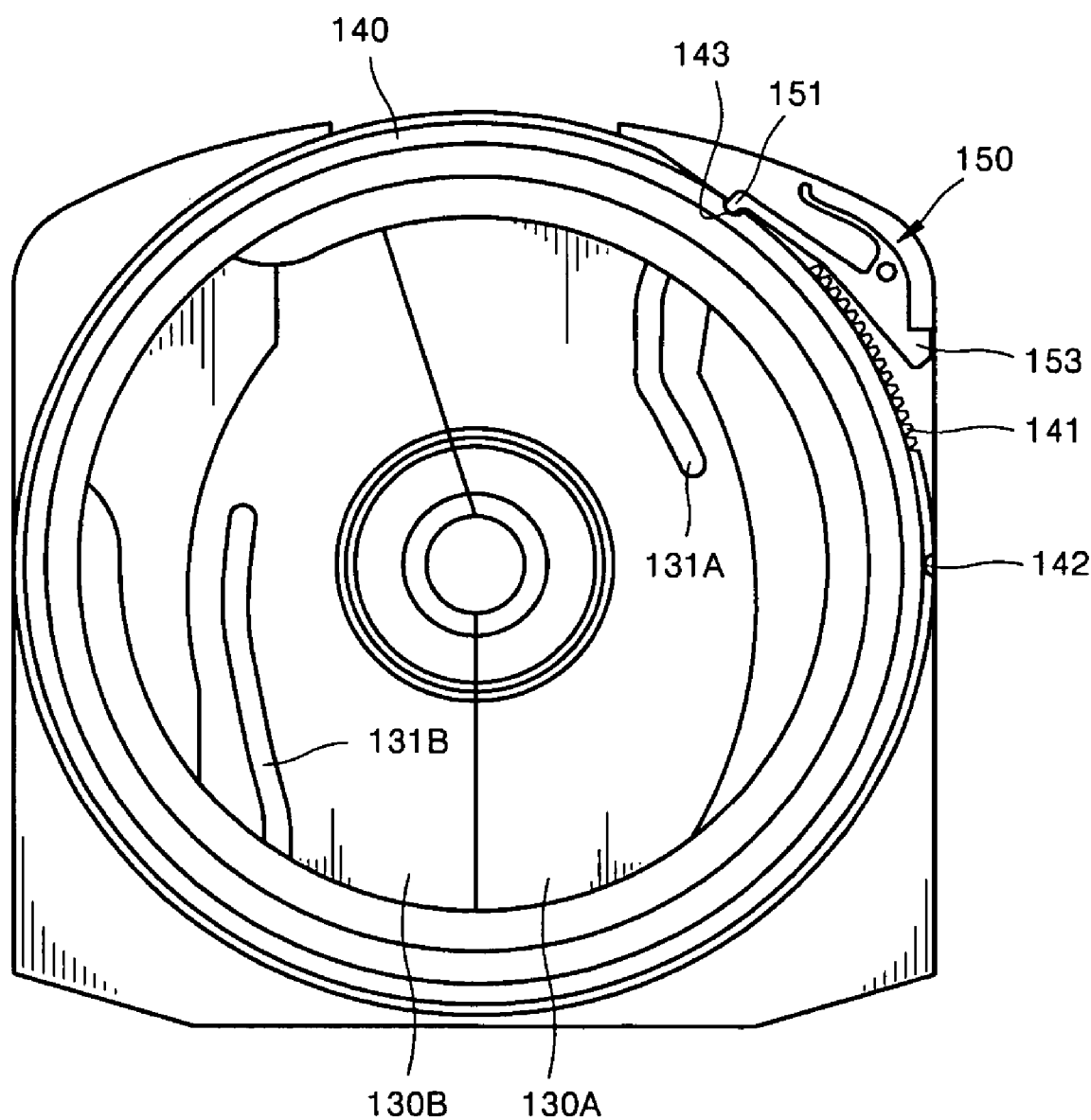
FIGS. 2 and 3 are plan views of the disk cartridge of FIG. 1 in a closed and an opened state, respectively.
Figure 3:
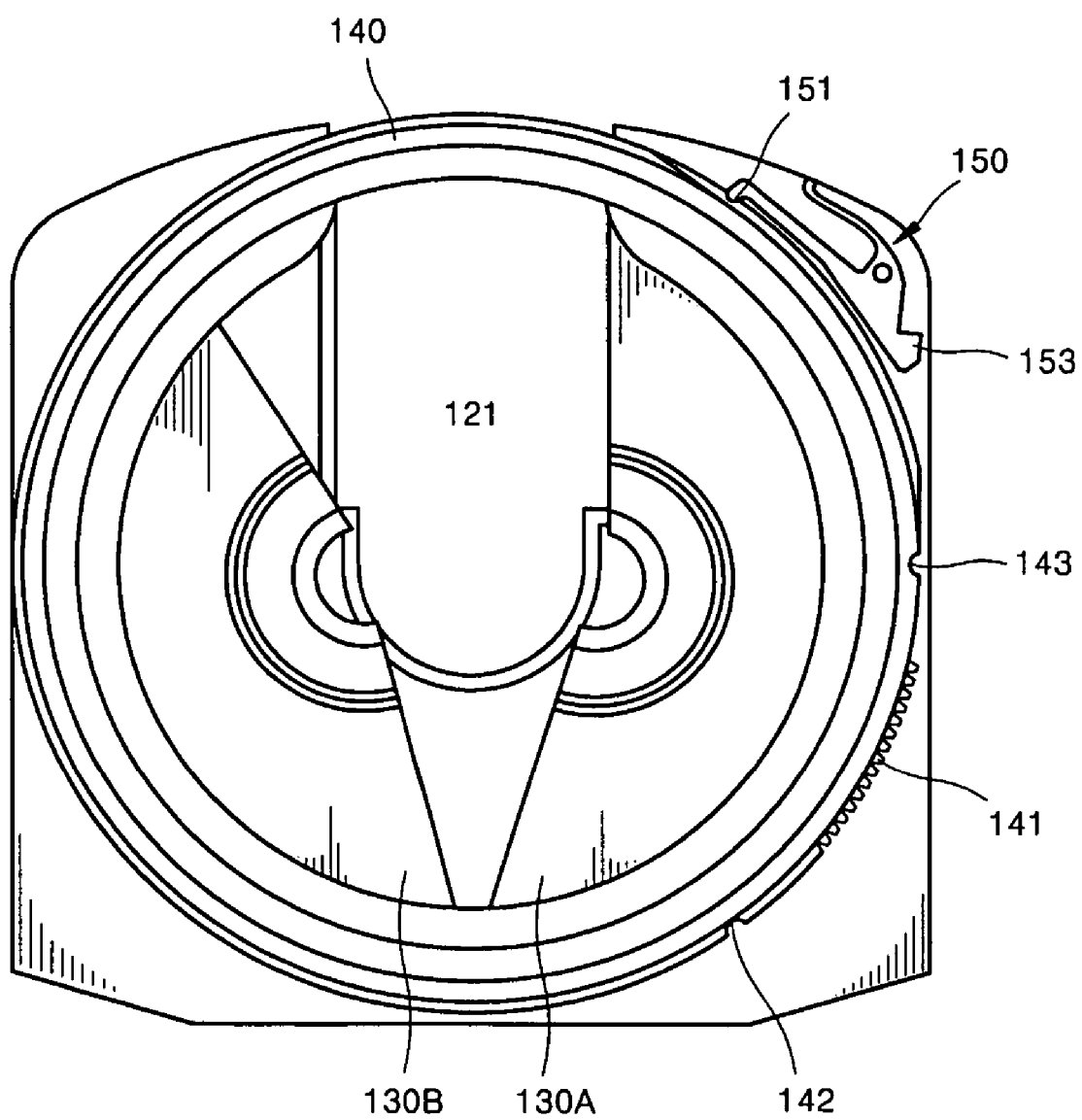

FIG. 1 is an exploded perspective view of a disk cartridge mounted inside a disk drive according to an embodiment of the present invention. FIGS. 2 and 3 are plan views of the disk cartridge of FIG. 1 in a closed and an opened state, respectively.

Referring to FIG. 1, a bottom cover 120 and a top cover 110 are combined to form a case in which a disk D is accommodated. An aperture 121 is formed on the bottom cover 120. The disk D is accommodated inside the case so that a recording surface of the disk D faces the aperture 121. A device to open and close the aperture 121 is formed on a disk cartridge 100. As an example, the device to open and close the aperture 121 includes one pair of shutters 130A and 130B, a rotating wheel 140, and a latch 150. The shutters 130A and 130B are installed on the bottom cover 120 to be able to pivot. The rotating wheel 140 is placed on top of the shutters 130A and 130B. One pair of protrusions 140A and 140B is formed on the bottom surface of the rotating wheel 140. The protrusions 140A and 140B are inserted into trajectories 131A and 131B formed on the shutters 130A and 130B, respectively. A first gear 141 is formed on the outer circumference of the rotating wheel 140. In addition, first and second coupling grooves 142 and 143 are formed on both ends of the first gear 141 on the outer circumference of the rotating wheel 140. The latch 150 is installed to pivot on the bottom cover 120. The latch 150 which selectively locks the rotating wheel 140 so as to selectively operate the shutters 130A and 130B, includes a hook portion 151 coupled to the second coupling groove 143 and an elastic arm 152 to elastically bias the hook portion 151 in a direction to be coupled to the second coupling groove 143. The elastic arm 152 is supported by the wall of the bottom cover 120. A first slot 122 through which an opening/closing member (310 of FIG. 5) accesses the first gear 141 and the first and second coupling grooves 142 and 143 is formed on one side of the bottom cover 120. In addition, a second slot 123 through which the opening/closing member 310 accesses the latch 150 is formed on one side of the bottom cover 120. While shown as being circular, it is understood that the wheel 140 can have non-circular shapes according to aspects of the invention.

When the aperture 121 is closed, as shown in FIG. 2, the hook 151 of the latch 150 is coupled to the second coupling groove 143 so as to lock the rotating wheel 140. In addition, the first coupling groove 142 of the rotating wheel 140 and an end 153 of the latch 150 are exposed to the outside of the disk cartridge 100 through the first and second slots 122 and 123, respectively. When the rotating wheel 140 is rotated by the opening/closing member 310 by accessing the latch 150 and the rotating wheel 140 through the first and second slots 122 and 123, the shutters 130A and 130B pivot through interaction of the protrusions 140A and 140B and the trajectories 131A and 131B, thereby opening the aperture 121, as shown in FIG. 3.

Figure 4:
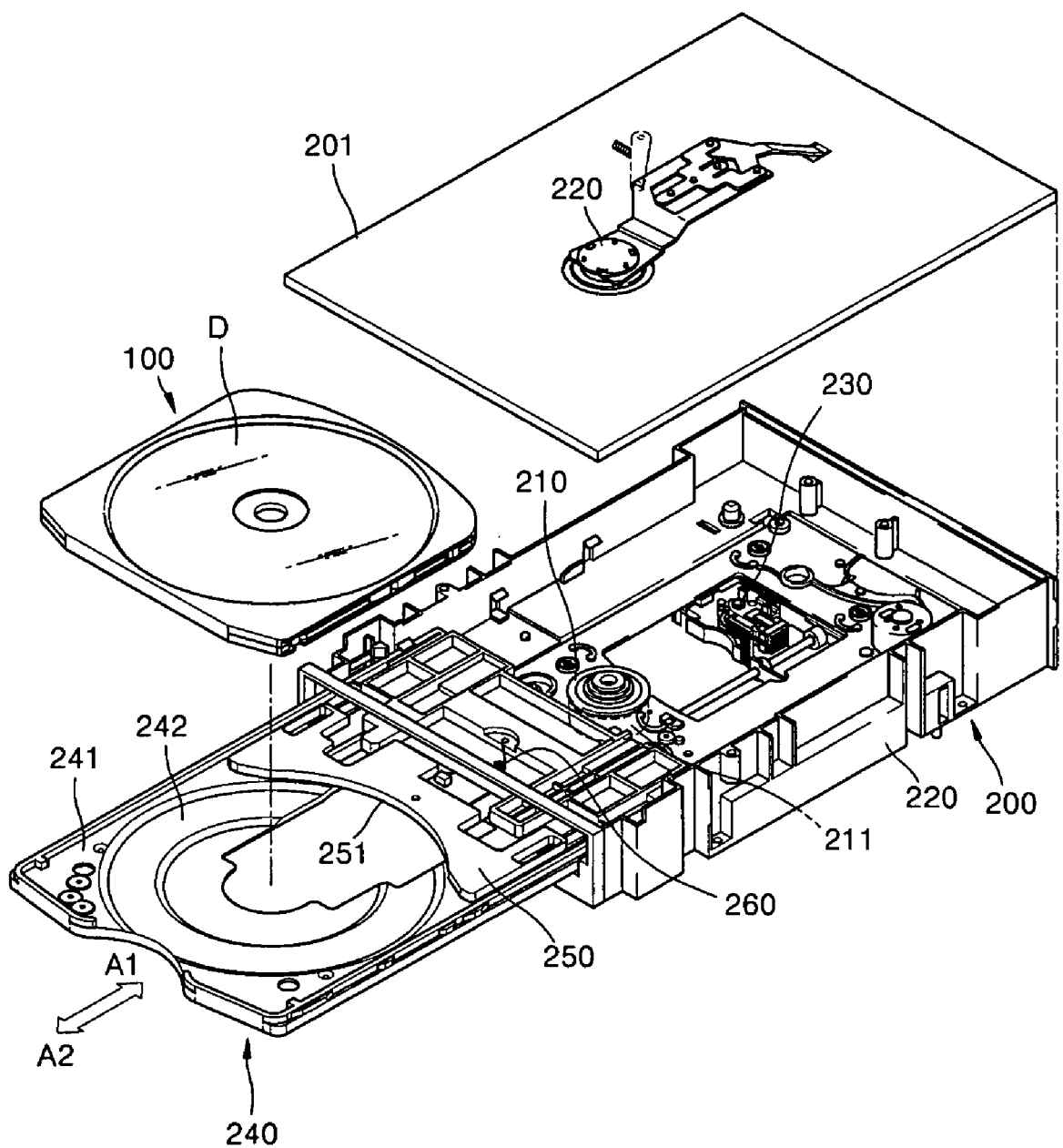
FIG. 4 is a perspective view of a disk drive according to an embodiment of the present invention.

FIG. 4 is a perspective view of a disk drive according to an embodiment of the present invention. Referring to FIG. 4, a main body 200 in which a spindle motor 211 that rotates the disk D, a turntable 210 on which the disk D is mounted, and an optical pickup 230 that performs recording/reproducing of information to/from the disk D are included; a tray 240, accommodating the disk cartridge 100 in which the disk D is mounted therein, to be able to move in and out of the main body 200; and a cover 201 that covers the main body 200 are illustrated. A damper 220 is installed on the cover 201 to clamp the disk D on the turntable 210. The tray 240 slides in the direction of arrows A1 and A2 of FIG. 4 to be loaded and unloaded.

while not required in all aspects, a cartridge guide 250 is further included in the tray 240, and elastically fixes the disk cartridge 100 accommodating the disk D to the tray 240 or guides a bear disk D without the disk cartridge 100. The cartridge guide 250 is elastically supported to the tray 240 by a spring 260. The disk cartridge 100 is placed on a first placing surface 241 of the tray 240. Then, the cartridge guide 250 is pushed back by the disk cartridge 100 and elastically fixes the disk cartridge 100 on the tray 240 by an elastic force of the spring 260. When the disk cartridge 100 is removed from the tray 240, the cartridge guide 250 is returned to an original position thereof by a recovery force of the spring 260. A curve portion 251 of the cartridge guide 250 has a substantially identical curve to an outer circumference of a second placing surface 242. Therefore, when the bear disk D is placed on the second placing surface 242, a placing location of the bare disk D is guided by the outer circumference of the second placing surface 242 and the curve portion 251 of the cartridge guide 250.

Figure 5:
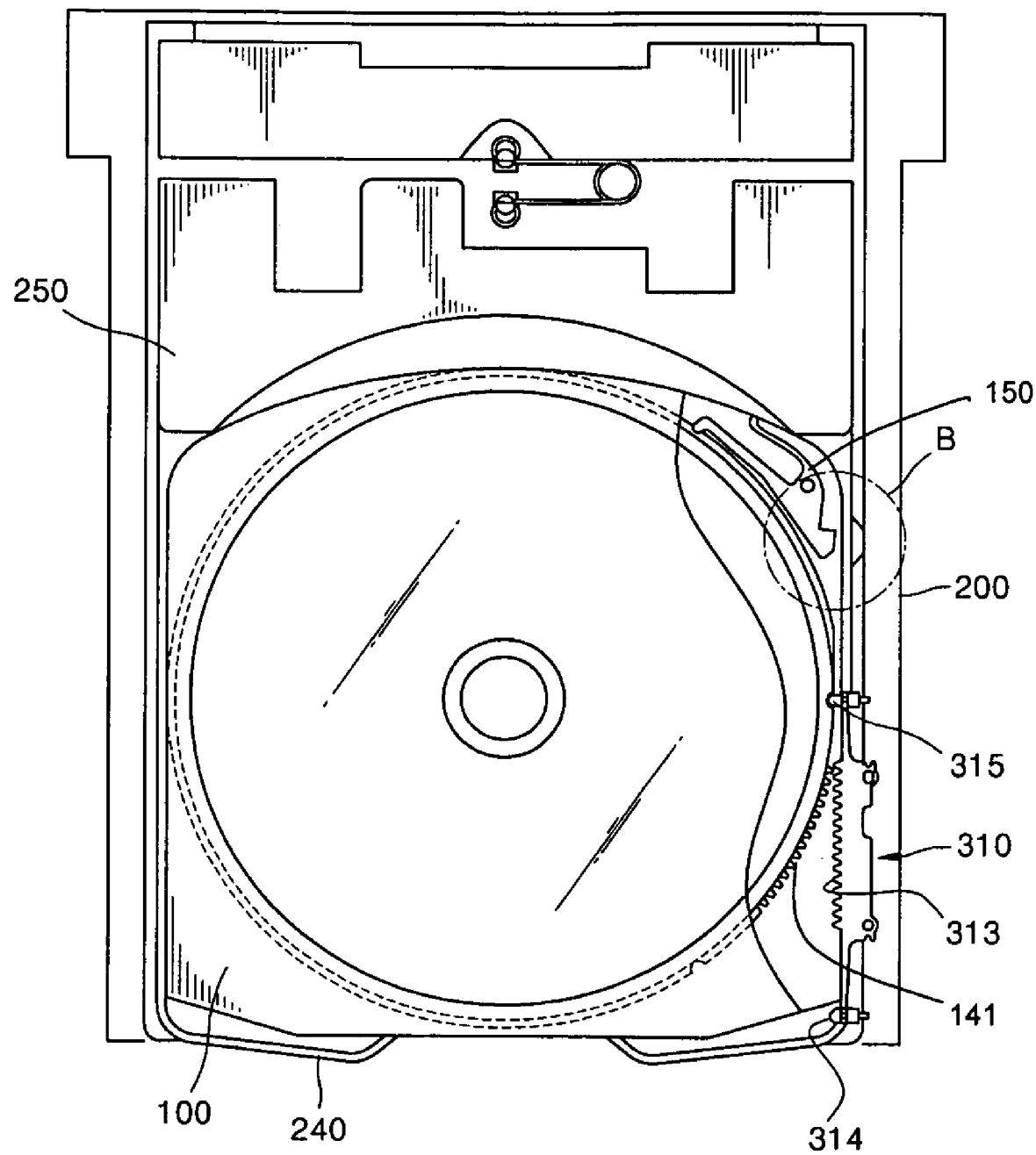
FIG. 5 is a plan view of FIG. 4.
Figure 6:
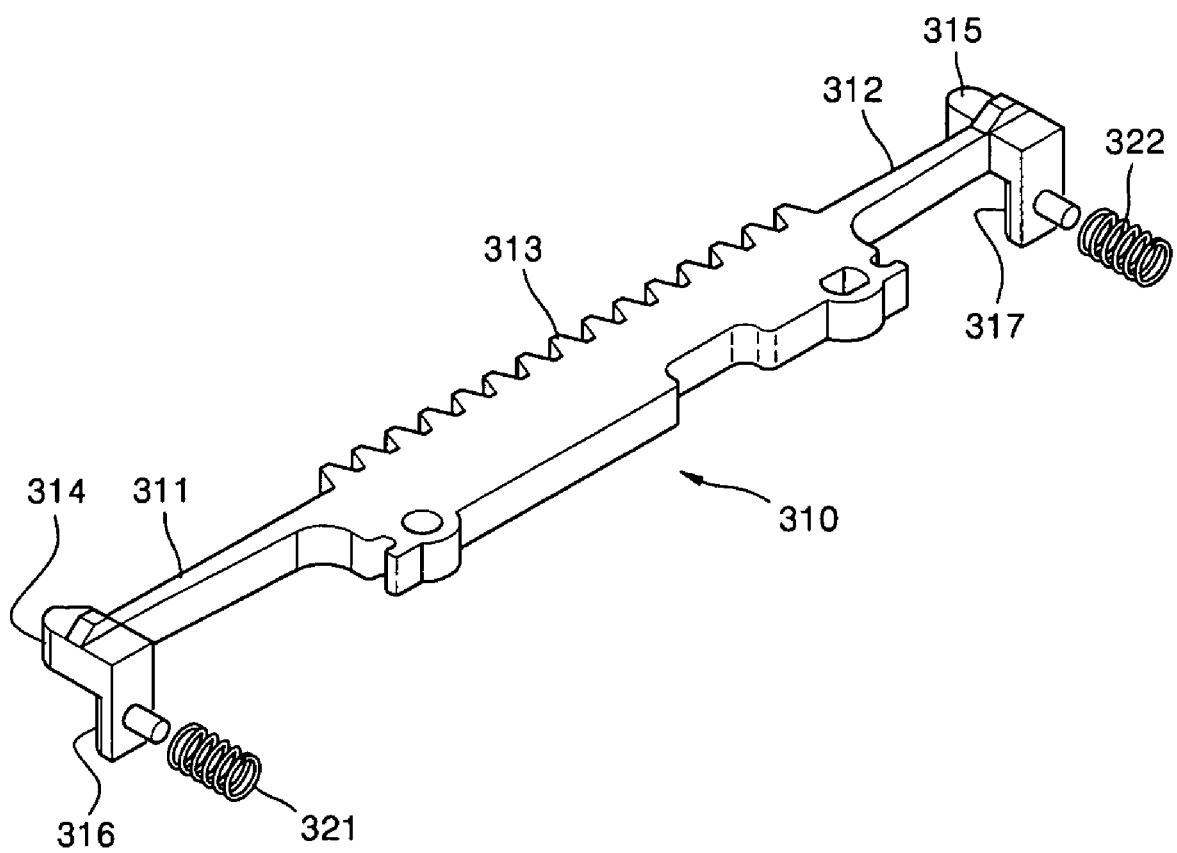
FIG. 6 is a perspective view of an opening/closing member of FIG. 5.

FIG. 5 is a plan view of the tray 240 shown in FIG. 4 and FIG. 6 is a perspective view of the opening/closing member of FIG. 5. Referring to FIGS. 5 and 6, the opening/closing member 310 is installed on one side of the main body 200 to open and close the aperture 121 of the disk cartridge 100 in connection with the loading/unloading operations of the tray 240. The opening/closing member 310 includes a second gear 313 which contacts the first gear 141 to rotate the rotating wheel 140 and a first protrusion 314 formed on one end of the second gear 313. The first protrusion 314 is coupled to the first coupling groove 142 of the rotating wheel 140 when the tray 240 is being loaded and temporarily rotates the rotating wheel 140 until the second gear 313 is coupled with the first gear 141 after the latch 150 is released from the second coupling groove 143. When the tray 240 is being unloaded, the first protrusion 314 is coupled to the first coupling groove 142 of the rotating wheel 140 and temporarily rotates the rotating wheel 140 until the latch 150 is coupled to the second coupling groove 143. The opening/closing member 310 may further include a second protrusion 315 formed on the other end of the second gear 313. The second protrusion 315 locks the rotating wheel 140 by coupling with the second coupling groove 143 of the rotating wheel 140 when the aperture 121 of the disk cartridge 100 is opened. In addition, the second protrusion 315 is coupled to the second coupling groove 143 and temporarily rotates the rotating wheel 140 until the second gear 313 is coupled with the first gear 141 when the tray 240 is being unloaded.

The second gear 313 and the first and second protrusions 314 and 315 of the opening/closing member 310 in the shown embodiment are formed as a single body. The first and second protrusions 314 and 315 are respectively formed on ends of first and second elastic arms 311 and 312 extended from both ends of the second gear 313. Accordingly, the first and second protrusions 314 and 315 may be elastically biased in a coupling direction with respect to the coupling to the disk cartridge 100, i.e., the first and second coupling grooves 142 and 143, by an elastic force of the first and second elastic arms 311 and 312. Also, as shown in FIG. 6, first and second elastic members 321 and 322 may be further included to elastically push the ends of the first and second elastic arms 311 and 312 to elastically bias the first and second protrusions 314 and 315 toward the disk cartridge 100. While shown as meshing gears 313 and 141, it is understood that other interlocking and/or frictional devices may be used to rotate the shutters 130A and 130B.

Figure 7:
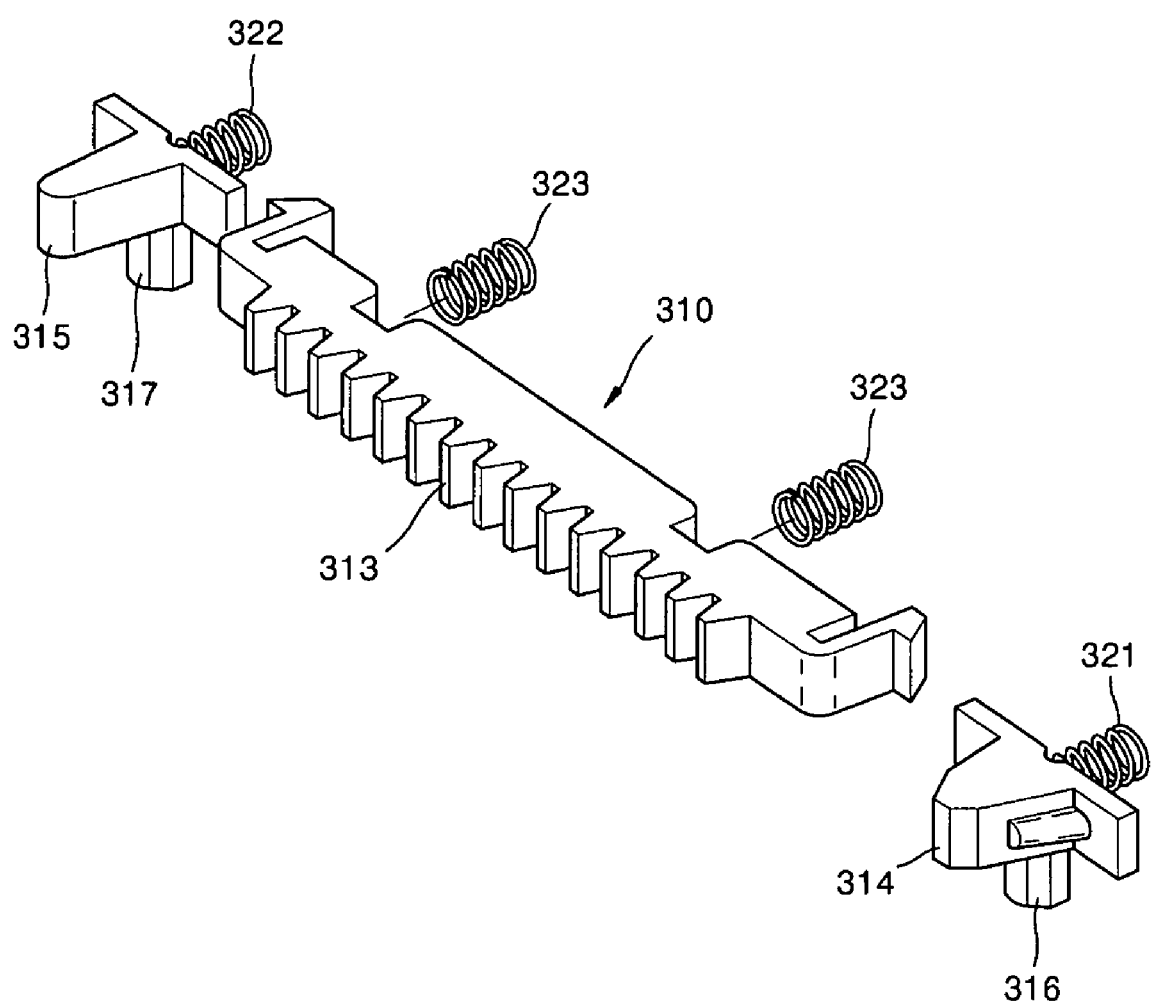
FIG. 7 is a perspective view of an opening/closing member according to another embodiment of the present invention.

As shown in FIG. 7, a second gear 313 and the first and second protrusions 314 and 315 may be produced as separate members and then combined with the main body 200 according to other embodiments of the invention. In this case, the opening/closing member 310 includes first and second elastic members 321 and 322 to elastically bias the first and second protrusions 314 and 315 toward the disk cartridge 100. While not required in all aspects, the member 310 further includes a third elastic member 323 to elastically bias the second gear 313 towards the disk cartridge 100 so that the second gear 313 can stably mesh with the first gear 141. Here, it is understood that the third elastic member 323 can be used in the embodiment shown in FIG. 6.

Figure 8:
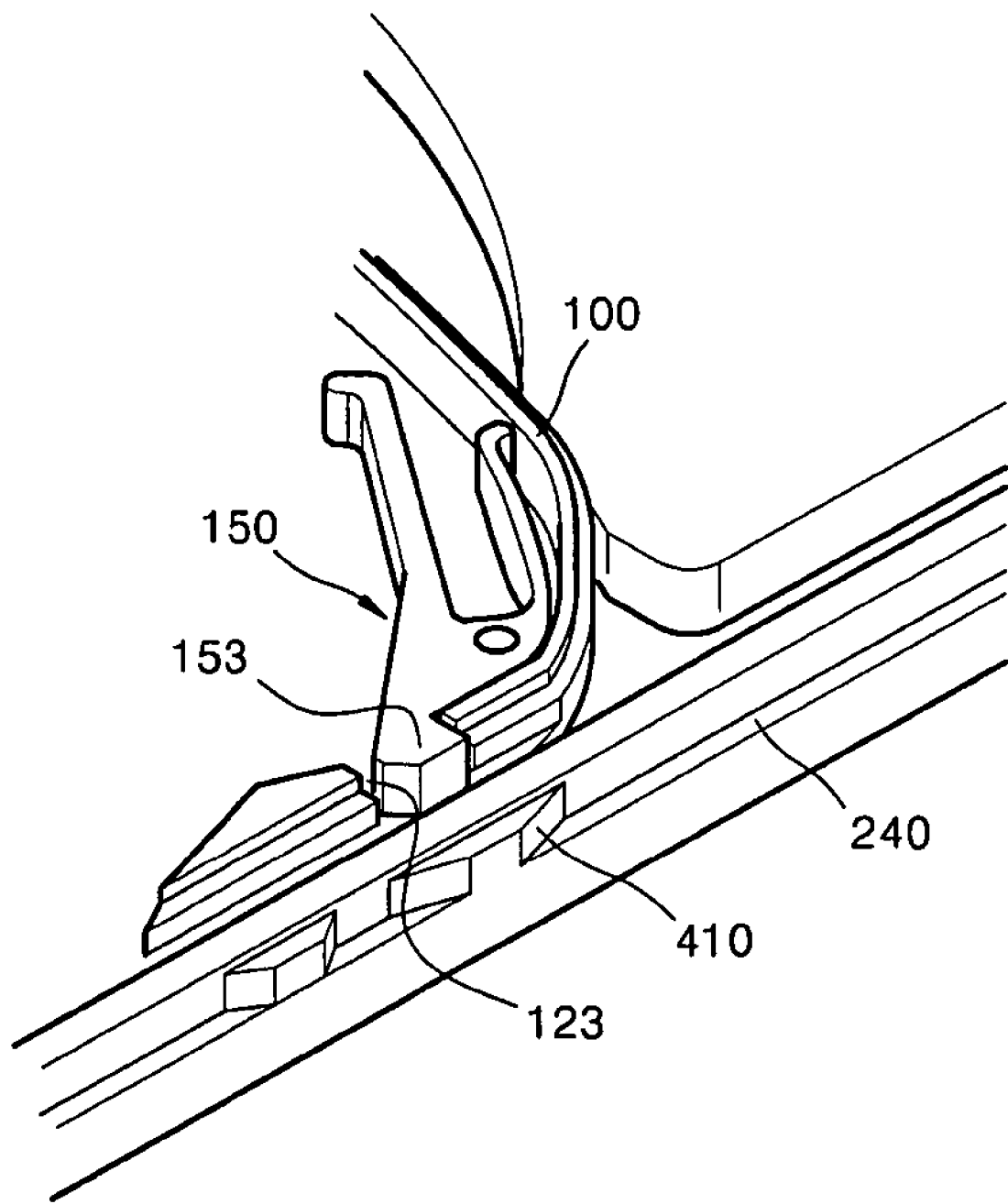
FIG. 8 is a perspective view of a portion B of FIG. 5.

FIG. 8 is a perspective view of a portion B in FIG. 5. Referring to FIG. 8, a guide 410 is formed on one side of the tray 240. The guide 410 prevents the first protrusion 314 from contacting the end 153 of the latch 150 during loading/unloading of the tray 240. The guide 410 protrudes from one side of the tray 240, below the second slot 123 through which the end 153 of the latch 150 is exposed to the outside when the disk cartridge 100 is mounted on the tray 240. As shown in FIGS. 6 and 7, a first contactor 316 that contacts the guide 410 is formed on the first protrusion 314. Furthermore, the guide 410 prevents the second protrusion 315 from contacting the end 153 of the latch 150 during loading/unloading of the tray 240. To do this, a second contactor 317 that contacts the guide 410 is formed on the second protrusion 315. However, it is understood that ones of the contactors 316 and 317 need not be used in all aspects of the invention.

The operation of the disk drive according to the present embodiment of the present invention with reference to FIGS. 1 through 8 and FIGS. 9 through 12 shows the loading/unloading process of the tray 240. When the disk cartridge 100 is mounted on the first placing surface 241 of the tray 240, the disk cartridge 100 is elastically fixed to the tray 240 by the elastic force of the spring 260. Here, the rotating wheel 140 does not rotate since the hook portion 151 of the latch 150 is coupled to the second coupling groove 143 of the rotating wheel 140, as shown in FIG. 2. In addition, the first coupling groove 142 of the rotating wheel 140 and the end 153 of the latch 150 are exposed to the outside of the disk cartridge 100 through the first and second slots 122 and 123, respectively.

Figure 9:
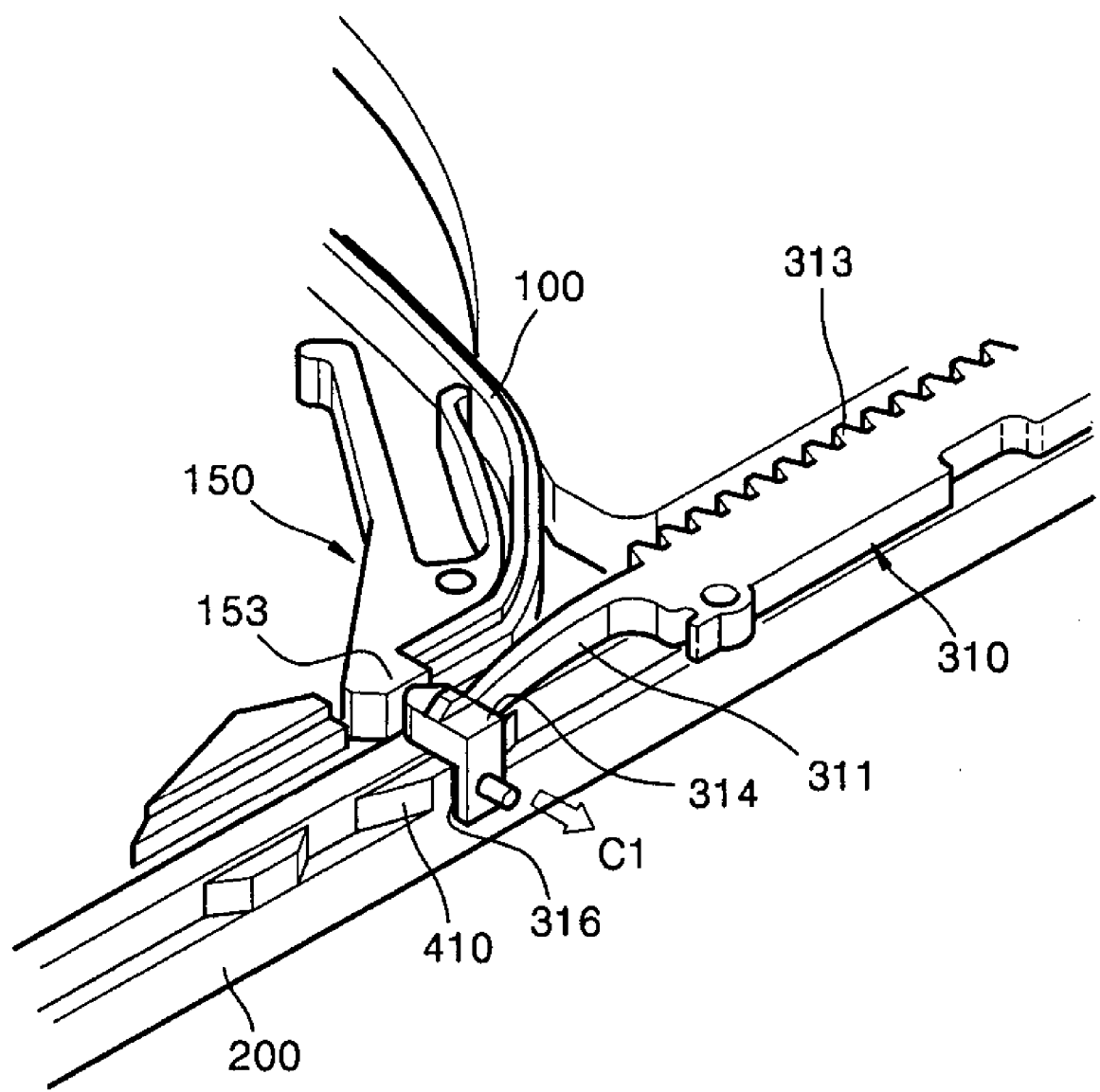
FIG. 9 is a perspective view illustrating an operation of a guide unit according to the present invention.

When the tray 240 slides in the direction of arrow A1 and starts to be loaded into the main body 200, the end 153 of the latch 150 approaches the first protrusion 314. Here, as shown in FIG. 9, the first elastic arm 311 moves in the direction of arrow C1 as the contactor 316 of the first protrusion 314 contacts the guide 410. Therefore, the first protrusion 314 is located where it does not interfere with the end 153 of the latch 150, and the rotating wheel 140 remains in the locked state.

Figure 10:
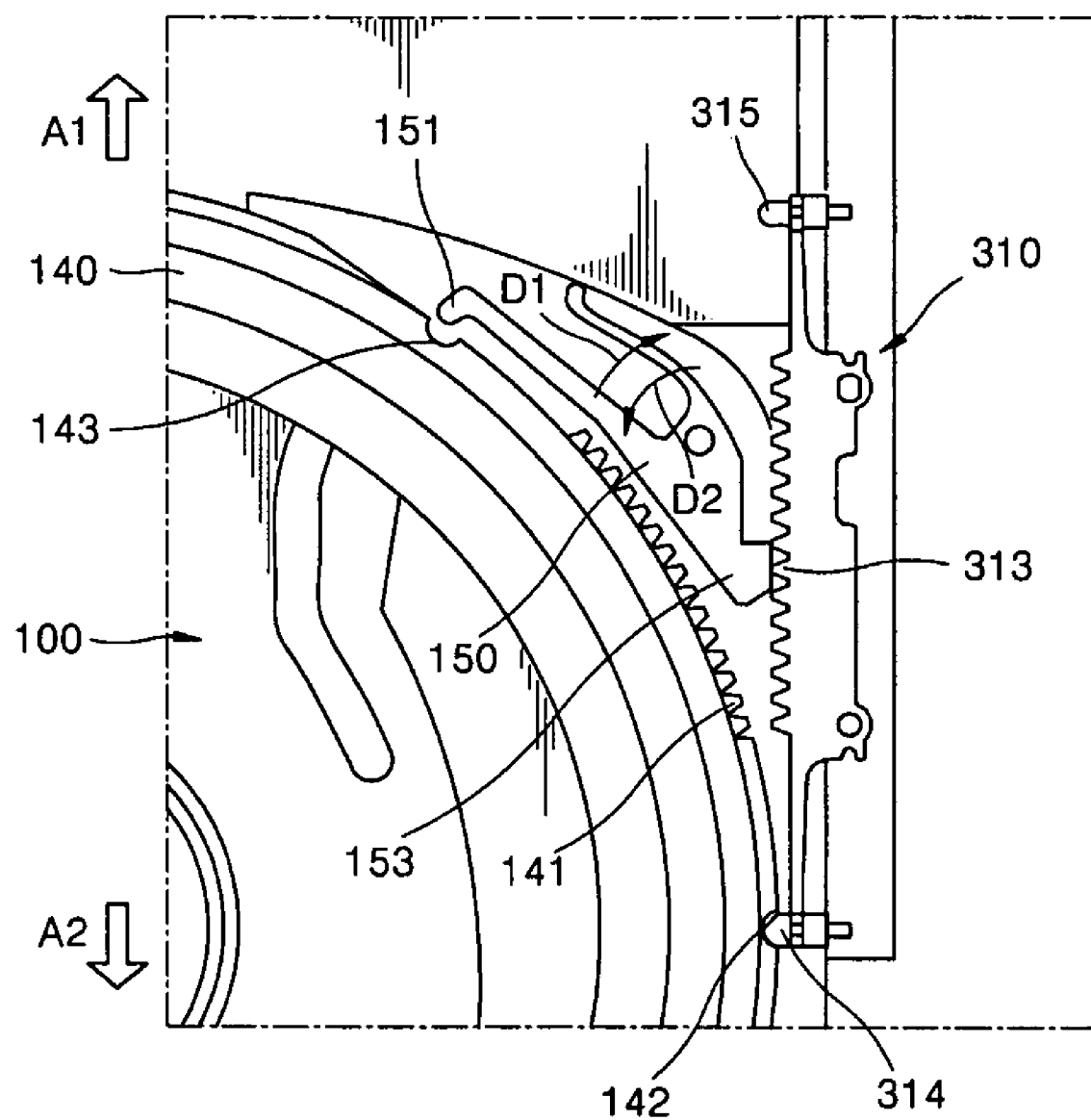
FIGS. 10 through 12 are plan views for explaining a process of loading/unloading the disk cartridge of the present invention.

When the tray 240 slides in the direction of arrow A1, the second gear 313 pushes the end 153 of the latch 150 and pivots the latch 150 in the direction of arrow D1, as shown in FIG. 10. The hook 151 is removed from the second coupling groove 143 and unlocks the rotating wheel 140. Here, the first protrusion 314 is coupled to the first coupling groove 142 of the rotating wheel 140 through the first slot 122 of the disk cartridge 100, and the rotating wheel 140 is rotated by the first protrusion 314 until the second gear 313 is meshed with the first gear 141 as the tray 240 continues to slide in the direction of arrow A1.

Figure 11:
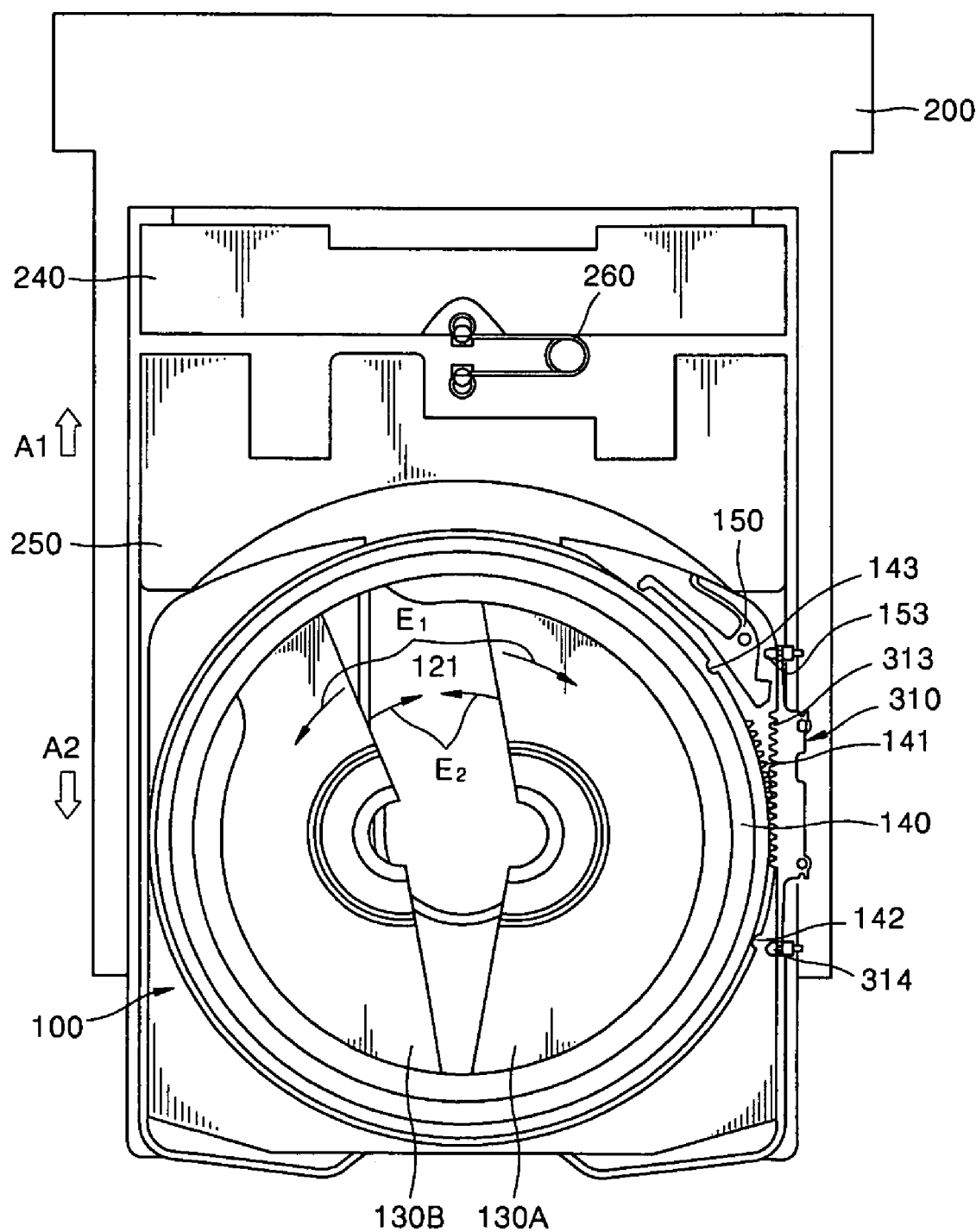
Figure 12:
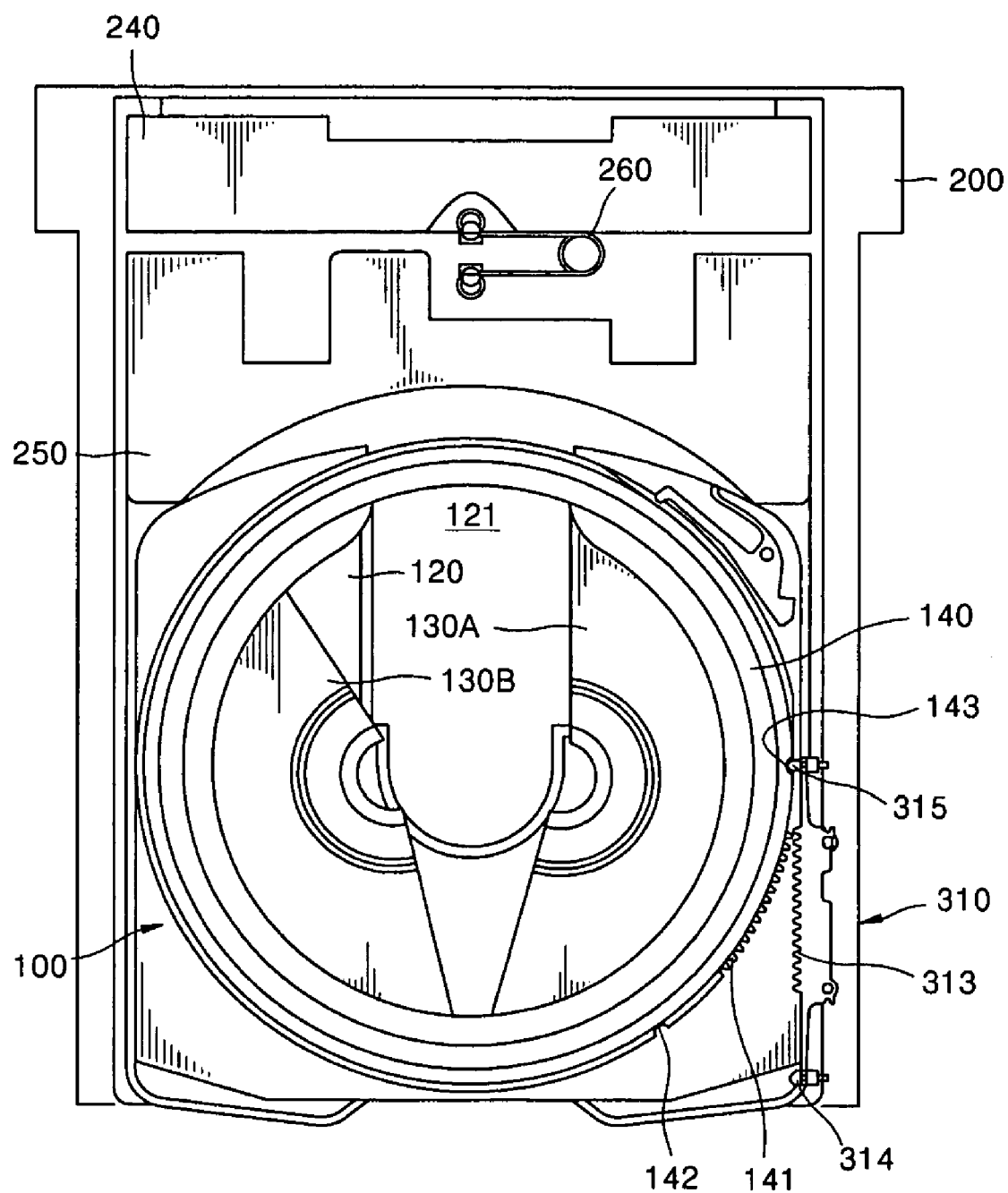

The shutters 130A and 130B then start to pivot in the direction of arrow E1 of FIG. 11 and start to open the aperture 121 as the rotating wheel 140 is rotated by meshing of the first gear 141 and the second gear 313 when the tray 240 continues to slide in the direction of arrow A1. Here, although not shown in the drawing, the second protrusion 315 does not contact the end 153 of the latch 150 since the second elastic arm 312 bends as the second contactor 317 comes in contact with the guide 410. When the loading of the tray 240 is completed, the second protrusion 315 is coupled with the second coupling groove 143 of the rotating wheel 140 and locks the rotating wheel 140, as shown in FIG. 12. Thus, the aperture 121 remains opened when the tray 240 with the disk cartridge 100 mounted thereon is completely loaded into the main body 200.

The unloading process in which the tray 240 slides in the direction of arrow A2 is carried out in the reverse order of the loading process. The shutters 130A and 130B pivot in the direction of arrow E2 by executing the processes shown in FIGS. 12, 11, and 10, thereby closing the aperture 121. In this case, the second protrusion 315 rotates the rotating wheel 140 until the first gear 141 is meshed with the second gear 313. The guide 410 prevents the second protrusion 315 from contacting with the end 153 of the latch 150. After the second gear 313 passes the end 153 of the latch 150, the first protrusion 314 is coupled to the first coupling groove 142 of the rotating wheel 140 and rotates the rotating wheel 140 until the hook portion 151 is coupled with the second coupling groove 143. The rotating wheel 140 does not rotate anymore when the latch 150 pivots in the direction D2 (see FIG. 10) by the recovery force of the elastic arm 152 and couples the second coupling groove 143 and the hook portion 151. Thus, the shutters 130A and 130B are locked while the aperture 121 is closed. Since the guide 410 prevents the first protrusion 314 from coming in contact with the end 153 of the latch 150, the shutters 130A and 130B maintain the locked state until the tray 240 is completely unloaded, as shown in FIG. 8.

The disk drive according to the shown embodiment does not produce unnecessary contacting noise during loading/unloading the tray 240 since the first and second protrusions 314 and 315 do not unnecessarily come in contact with the second slot 123 of the disk cartridge 100 and the latch 150. In addition, the shutters 130A and 130B may be locked/unlocked with reliability since damage to the first and second protrusions 314 and 315, the second slot 123 of the disk cartridge 100, and the latch 150 through excessive contact may be prevented.

Furthermore, when the first protrusion 314 comes in contact with the end 153 of the latch 150 during unloading of the tray 240, the latch 150 pivots in the direction of arrow D1, so as to unlock the rotating wheel 140. Then, the disk cartridge 100 is removed from the tray 240 while the rotating wheel 140 is unlocked. When carrying around the disk cartridge 100 in this current state, foreign substances such as dust may enter inside the disk cartridge 100 through the aperture 121 since the shutters 130A and 130B are opened. However, according to the present embodiment, the disk cartridge 100 cannot be removed from the tray 240 when the rotating wheel 140 is unlocked because the disk drive of the present embodiment is designed so that the first protrusion 314 does not come in contact with the latch 150 during the loading/unloading process of the disk cartridge 100 mounted on the tray 240.

When the opening/closing member 310 applies the separate second gear 313 and the first and second protrusions 314 and 315 as shown in FIG. 7, the first and second protrusions 314 and 315 are pushed in the direction opposite to the elastic force of the first and second elastic members 321 and 322 by coming in contact with the guide 410, and thus, not contacting the first and second protrusions 314 and 315 and the end 153 of the latch 150. In addition, the guide 410 prevents the first and second protrusions 314 and 315 from contacting the second slot 123 during the loading/unloading process of the tray 240.

Figure 13:
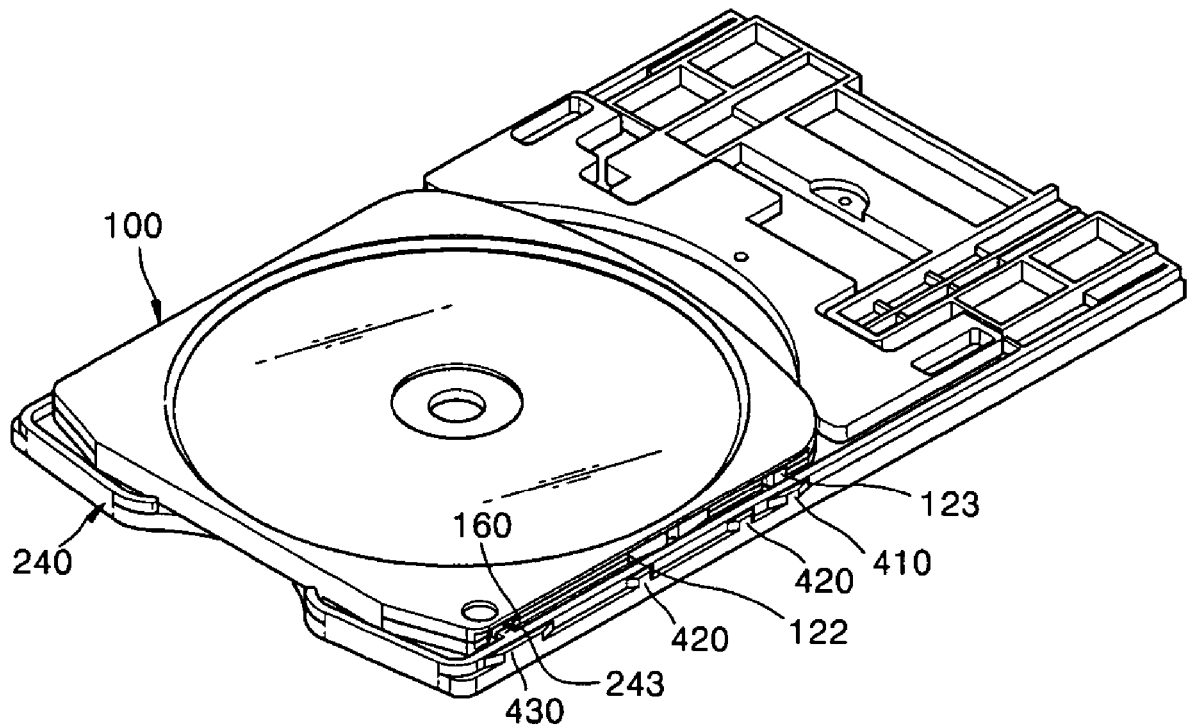
FIG. 13 is a perspective view of a disk drive according to another embodiment of the present invention.
Figure 14:
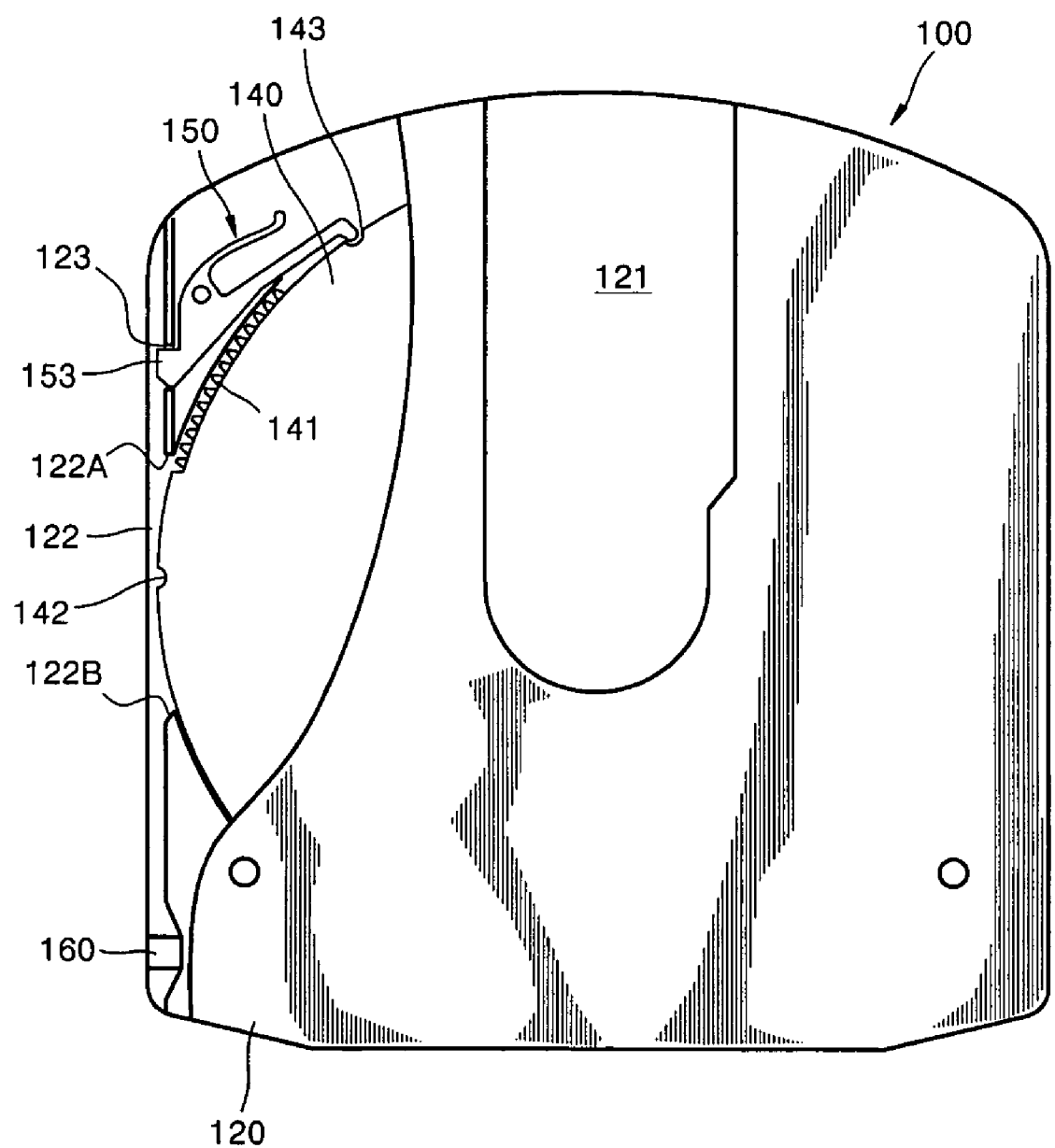
FIG. 14 is a rear view of the disk cartridge of the present invention.

FIG. 13 is a perspective view of a disk drive according to another embodiment of the present invention and FIG. 14 is a bottom view of a disk cartridge for use with the disk drive of FIG. 13. Below, elements with identical reference numerals in FIGS. 1 through 12 and substantially the same operations are denoted as identical reference numerals and their descriptions will be omitted.

As shown in FIG. 14, generally both ends 122A and 122B of the first slot 122 are formed as a sharp edge. The both ends 122A and 122B of the first slot 122 pass first and second protrusions 314 and 315 for the first and second protrusions 314 and 315 to be able to access the rotating wheel 140 while the tray 240 is being loaded/unloaded. Noise is produced when the both ends 122A and 122B of the first slot 122 contact the first and second protrusions 314 and 315. In addition, the both ends 122A and 122B of the first slot 122 and the first and second protrusions 314 and 315 may be damaged when the both ends 122A and 122B of the first slot 122 and the first and second protrusions 314 and 315 repetitively come in contact with each other.

A first contact preventer 420 is formed on one side of the tray 240 to avoid the first and second protrusions 314 and 315 from contacting the both ends 122A and 122B of the first slot 122. In the present embodiment, the first contact preventer 420 is protruded from one side of the tray 240. The first contact preventer 420 is formed below the both ends 122A and 122B of the first slot 122 when the disk cartridge 100 is mounted on the tray 240.

The disk cartridge 100 should be mounted on a predetermined location of the tray 240. To do this, a recessed portion 160 is formed on one side of the disk cartridge 100 as shown in FIG. 14, and a coupling part 243 is formed on the tray 240 which is inserted into the recessed portion 160, as shown in FIG. 13. A disk accommodated inside the disk cartridge 100 typically has a recording layer facing the bottom and an aperture 121 formed to face the recording layer. Therefore, the disk cartridge 100 should be mounted on the tray 240 so that the aperture 121 faces the spindle motor 210 (not shown in FIGS. 13 and 14) and the optical pickup 230 (not shown in FIGS. 13 and 14). If the recessed portion 160 is formed to have a blocked top portion and an opened bottom portion, the disk cartridge 100 being mounted upside down may be prevented. In other words, the coupling part 243 cannot be inserted into the recessed portion 160 because the top portion of the recessed portion 160 is blocked when the disk cartridge 100 is upside down. Thus, the user realizes that the disk cartridge 100 is upside down. The first and second protrusions 314 and 315 pass by the recessed portion 160 during the loading/unloading process of the tray 240. During this process, contacting noise or damage to the first and second protrusions 314 and 315 may occur due to repetitive contact with the recessed portion 160. To prevent such damage, a second contact preventer 430 may be further formed on one side of the tray 240 as shown in FIG. 13. In the present embodiment, only the first protrusion 314 passes the recessed portion 160 during the loading/unloading process of the tray 240. However, the first and second protrusions 314 and 315 may pass the recessed portion 160 depending on the location on which the recessed portion 160 is formed. The second contact preventer 430 is protruded from one side of the tray 240. The second contact preventer 430 is formed below the recessed portion 160 when the disk cartridge 100 is mounted on the tray 240.

The role of the first and second contact preventers 420 and 430 is similar to that of the guide 410. That is, when the both ends 122A and 122B of the first slot 122 approach the first and second protrusions 314 and 315, the first and second contactors 316 and 317 come in contact with the first contact preventer 420 first, so as to bend the first and second elastic arms 311 and 312 in the direction of arrow C1 in FIG. 9 during loading/unloading of the tray 240. Therefore, the first and second protrusions 314 and 315 access the rotating wheel 140 after avoiding contacting the both ends 122A and 122B of the first slot 122. In addition, when the tray 240 is almost loaded, the recessed portion 160 approaches the first protrusion 314. Here, as the second contact preventer 430 contacts with the first contactor 316, the first elastic arm 311 bends in the direction of arrow C1 in FIG. 9 and the first protrusion 314 avoids contacting the recessed portion 160.

The disk drive according to the shown embodiment does not produce unnecessary contacting noise during loading/unloading of the tray 240 since the first and second protrusions 314 and 315 do not unnecessarily come in contact with the first slot 122 of the disk cartridge 100 and the recessed portion 160. In addition, the shutters 130A and 130B can be locked/unlocked with reliability since damage to the first and second protrusions 314 and 315, the first slot 122 of the disk cartridge 100, and the recessed portion 160 through excessive contact may be avoided.

When the opening/closing member 310 adopts the separate second gear 313 and the first and second protrusions 314 and 315 as shown in FIG. 7, the first and second protrusions 314 and 315 are pushed in the direction opposite to the elastic force of the first and second elastic members 321 and 322 by contacting with the first and second contact preventers 420 and 430 and thus, not contacting with the first and second protrusions 314 and 315 and the first slot 122 and the recessed portion 160.

According to above-mentioned disk drive of the present invention, the following effects may be achieved. By avoiding unnecessary contact between an opening/closing member and a disk cartridge during loading/unloading operation of a tray with the disk cartridge mounted thereon, contacting noise may be decreased. In addition, shutters may be locked/unlocked with a high reliability by avoiding damage to the disk cartridge or the opening/closing device caused by repetitive contact between the opening/closing device and the disk cartridge. Also, by preventing unnecessary contact between a latch that locks the shutters and the opening/closing device during loading/unloading of the tray with the disk cartridge mounted thereon, contacting noise may be decreased. Moreover, the shutters may be locked when an aperture of the disk cartridge is completely closed during unloading the tray. By doing so, foreign substances such as dust are prevented from entering into the disk cartridge through the aperture.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk drive with a disk cartridge mounted therein, the disk cartridge including a case with an aperture in which a disk is accommodated, a rotating wheel with a first gear formed on an outer circumference thereof and rotating to open and close the aperture, and a latch to lock the rotating wheel when the aperture is closed, the disk drive comprising:
    a main body;
    a tray on which the disk cartridge is mounted and being loaded into and unloaded from the main body;
    an opening and closing member formed on the main body, including:
        a second gear rotating the rotating wheel by meshing with the first gear, and
        a first protrusion formed on a first end of the second gear and temporarily rotating the rotating wheel so that the first and second gears mesh; and
    a guide formed on a side of the tray to push the first protrusion during the loading/unloading of the tray so that the first protrusion does not contact the latch.

2. The disk drive of claim 1, wherein the opening and closing member further comprises a second protrusion formed on a second end of the second gear, and the guide pushes the second protrusion during loading/unloading of the tray so that the second protrusion does not contact the latch.

3. The disk drive of claim 2, further comprising first and second elastic arms respectively extending from the first and second ends of the second gear, wherein the first and second protrusions are respectively formed on the first and second elastic arms.

4. The disk drive of claim 3, further comprising:
    first and second elastic members to elastically bias the first and second protrusions, respectively, toward the disk cartridge.

5. The disk drive of claim 2, wherein the first and second protrusions, and the second gear are installed on the main body as separate members,
    the disk drive further comprising:
    first through third elastic elements to respectively elastically bias the first and second protrusions, and the second gear toward the disk cartridge.

6. The disk drive of claim 2, further comprising a slot having first and second ends formed on a side of the disk cartridge through which the first and second protrusions access the rotating wheel,
    the disk drive further comprising:
    a contact preventer formed on the side of the tray to prevent the first and second ends of the slot from respectively coming in contact with the first and second protrusions when the first and second protrusions access the rotating wheel through the slot.

7. The disk drive of claim 2, further comprising a recessed portion formed on a side of the disk cartridge to prevent the disk cartridge from being mounted on the tray upside down, the disk drive further comprising:
    a contact preventer formed on the side of the tray to prevent the recessed portion from coming in contact with the first and second protrusions.

8. A disk drive with a disk cartridge mounted therein, the disk cartridge including a case with an aperture in which a disk is accommodated, a rotating wheel with a first gear formed on an outer circumference thereof and rotating to open and close the aperture, a slot comprising first and second ends formed on one a side of the disk cartridge, and a latch to lock the rotating wheel when the aperture is closed, the disk drive comprising:
    a main body;
    a tray on which the disk cartridge is mounted and is loaded into and unloaded from the main body;
    an opening and closing member formed on the main body, including:
        a second gear rotating the rotating wheel by meshing with the first gear, and,
        a first protrusion formed on a first end of the second gear and temporarily rotating the rotating wheel so that the first and second gears mesh, the first protrusion accessing the rotating wheel through the slot comprising the first and second ends, and
    a first contact preventer formed on a side of the tray to push the opening and closing member to prevent the first protrusion from contacting the first and second ends of the slot.

9. The disk drive of claim 8, further comprising a recessed portion formed on the side of the disk cartridge to prevent the disk cartridge from being mounted on the tray upside down, the disk drive further comprising:
    a second contact preventer formed on the side of the tray to prevent the recessed portion from coming in contact with the first protrusion.

10. The disk drive of claim 8, wherein the opening and closing member further comprises a second protrusion formed on a second end of the second gear, and the first contact preventer pushes the second protrusion during loading/unloading of the tray so that the first and second ends of the slot do not contact the second protrusion.

11. The disk drive of claim 10, further comprising first and second elastic arms respectively extending from the first and second ends of the second gear, wherein the first and second protrusions are respectively formed on the first and second elastic arms.

12. The disk drive of claim 11, further comprising:
    first and second elastic members to elastically bias the first and second protrusions, respectively, toward the disk cartridge.

13. The disk drive of claim 10, wherein the first and second protrusions, and the second gear are installed on the main body as separate members, the disk drive further comprising:
first through third elastic elements to elastically bias the first and second protrusions, and the second gear, respectively, toward the disk cartridge.

14. An apparatus with a disk cartridge mounted therein, the disk cartridge including a case in which a disk is accommodated with an aperture through which the disk is accessed, a rotating member with a first gear to open and close the aperture following the loading/unloading operations of the disk cartridge, and a latch to lock the rotating member when the aperture is closed and opened, the apparatus comprising a member to cause the rotating member to open and close the aperture, the member comprising:
- a second gear to mesh with the first gear so as to rotate the rotating wheel after the latch is unlocked at respective beginnings of the loading/unloading operations and before the latch is locked at respective ends of the loading/unloading operations,
- a first protrusion formed on a first end of the second gear and temporarily rotating the rotating wheel so that the first and second gears mesh, and
- a guide to push the first protrusion during the loading/ unloading of the tray so that the first protrusion does not contact the latch.

15. The apparatus according to claim 14, wherein the member further comprises a second protrusion formed on a second end of the second gear to secure the rotating member when the disk cartridge is unloaded.

16. The apparatus according to claim 15, wherein the second protrusion does not contact the latch during loading/ unloading operations.

17. The apparatus according to claim 16, further comprising first and second elastic arms respectively extending from the first and second ends of the second gear, wherein the first and second protrusions are respectively formed on the first and second elastic arms.

18. The apparatus according to claim 17, further comprising first and second elastic members to elastically bias the first and second protrusions, respectively, toward the disk cartridge.

19. The apparatus according to claim 16, further comprising a slot having first and second ends formed on a side of the disk cartridge through which the first and second protrusions access the rotating wheel.

20. The apparatus according to claim 16, further comprising a recessed portion formed on a side of the disk cartridge to prevent the disk cartridge from being mounted upside down.

21. The apparatus according to claim 20, further comprising a contact preventer to prevent the recessed portion from coming in contact with the first and second protrusions.

22. The apparatus according to claim 19, wherein the disk drive further comprises a contact preventer to prevent the first and second ends of the slot from respectively coming in contact with the first and second protrusions when the first and second protrusions access the rotating wheel through the slot.

23. The apparatus according to claim 15, wherein the first and second protrusions do not contact the latch.

* * * * *